United States Patent
Caster et al.

(10) Patent No.: US 10,479,428 B2
(45) Date of Patent: Nov. 19, 2019

(54) PATIO FOR RAMP DOOR

(71) Applicant: MORryde International, Inc., Elkhart, IN (US)

(72) Inventors: Michael Caster, Elkhart, IN (US); Chris Taylor, Elkhart, IN (US); Ben Yoder, Elkhart, IN (US)

(*) Notice: Subject to any disclaimer, the term of this patent is extended or adjusted under 35 U.S.C. 154(b) by 69 days.

(21) Appl. No.: 15/977,423

(22) Filed: May 11, 2018

(65) Prior Publication Data
US 2018/0334208 A1 Nov. 22, 2018

Related U.S. Application Data

(60) Provisional application No. 62/506,700, filed on May 16, 2017.

(51) Int. Cl.
- *B62D 63/06* (2006.01)
- *B60P 3/34* (2006.01)
- *B60P 1/43* (2006.01)

(52) U.S. Cl.
CPC ............. *B62D 63/061* (2013.01); *B60P 3/34* (2013.01); *B60P 1/433* (2013.01)

(58) Field of Classification Search
CPC .......... B62D 63/061; B60P 1/433; B60P 3/34
USPC ......................................................... 296/162
See application file for complete search history.

(56) References Cited

U.S. PATENT DOCUMENTS

| | | | |
|---|---|---|---|
| 2016/0096465 A1* | 4/2016 | Kauffman | B60P 3/36 296/162 |
| 2018/0022262 A1* | 1/2018 | Roth | B60P 3/34 296/162 |
| 2018/0056845 A1* | 3/2018 | Ousley | B60P 3/34 |
| 2019/0270364 A1* | 9/2019 | Roth | B60J 5/102 |

* cited by examiner

*Primary Examiner* — Jason S Morrow
(74) *Attorney, Agent, or Firm* — Botkin & Hall, LLP

(57) ABSTRACT

A patio that is pivotable over a ramp door via hinges fixed with respect to the ramp door. The patio has a wall that is pivots to align a catch plate to a kingpin. The kingpin is for being secured to the ramp door. The kingpin has a major diameter, an undercut, and a shoulder near a distal end. The shoulder is spaced from the ramp door when the kingpin is affixed to the ramp door. The catch plate is moveable to the kingpin so that the slot receives the undercut of the kingpin and the catch plate is retained between the shoulder of the kingpin and ramp door when the undercut is in the first slot.

19 Claims, 20 Drawing Sheets

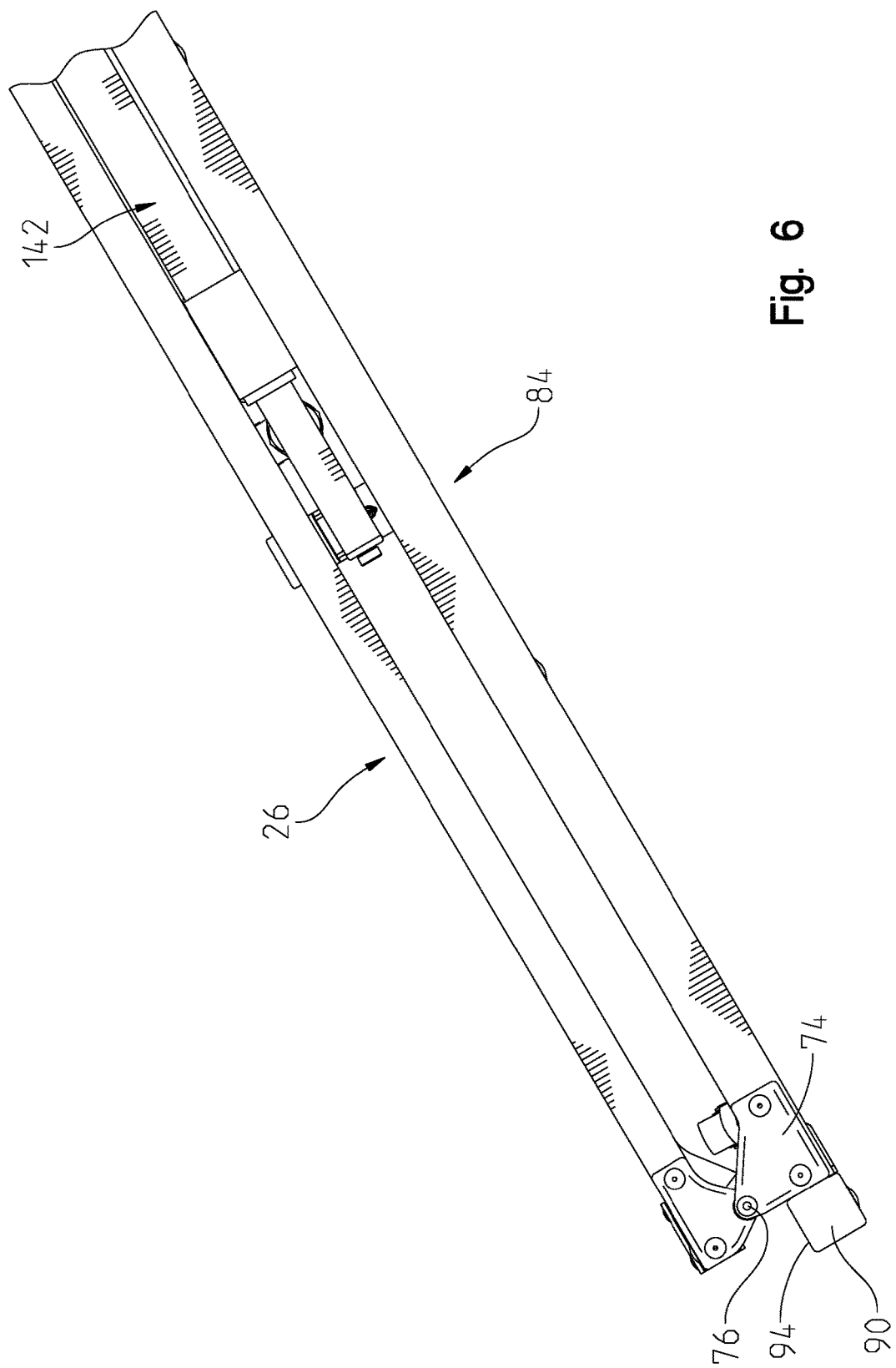

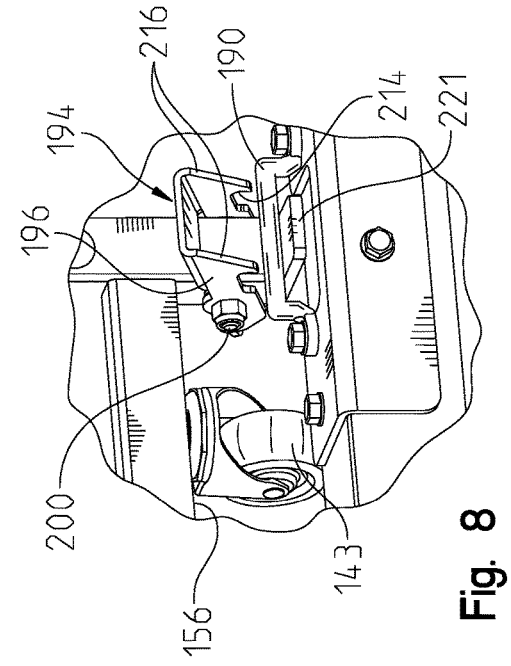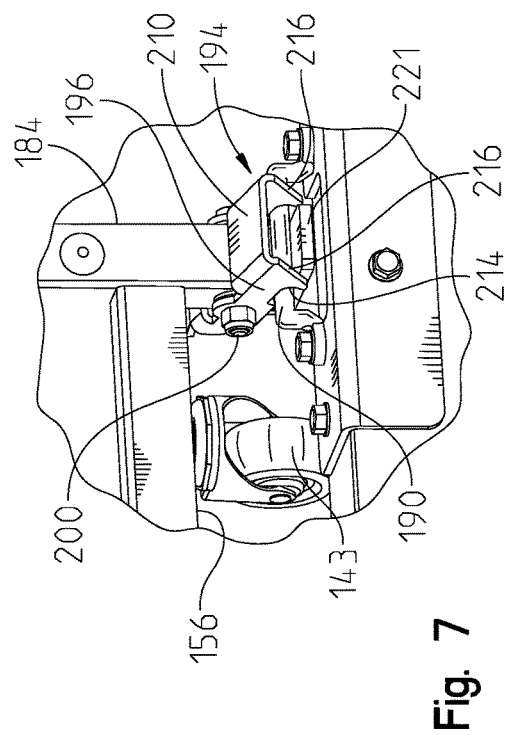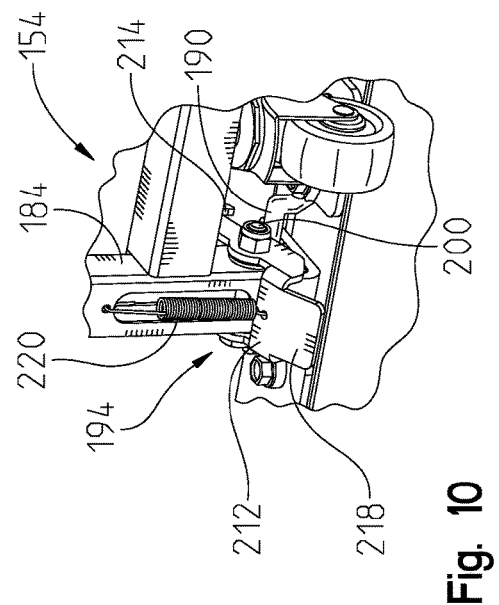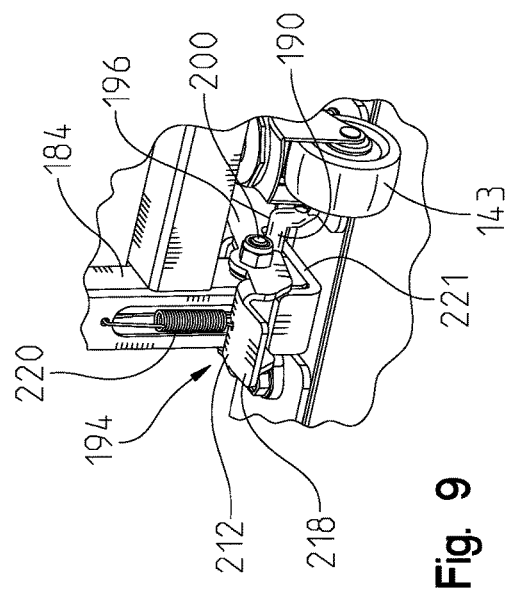

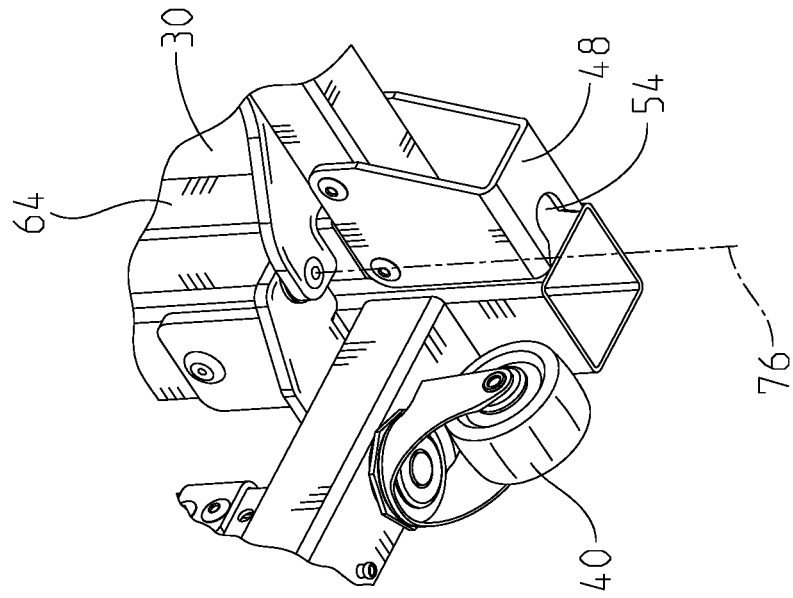
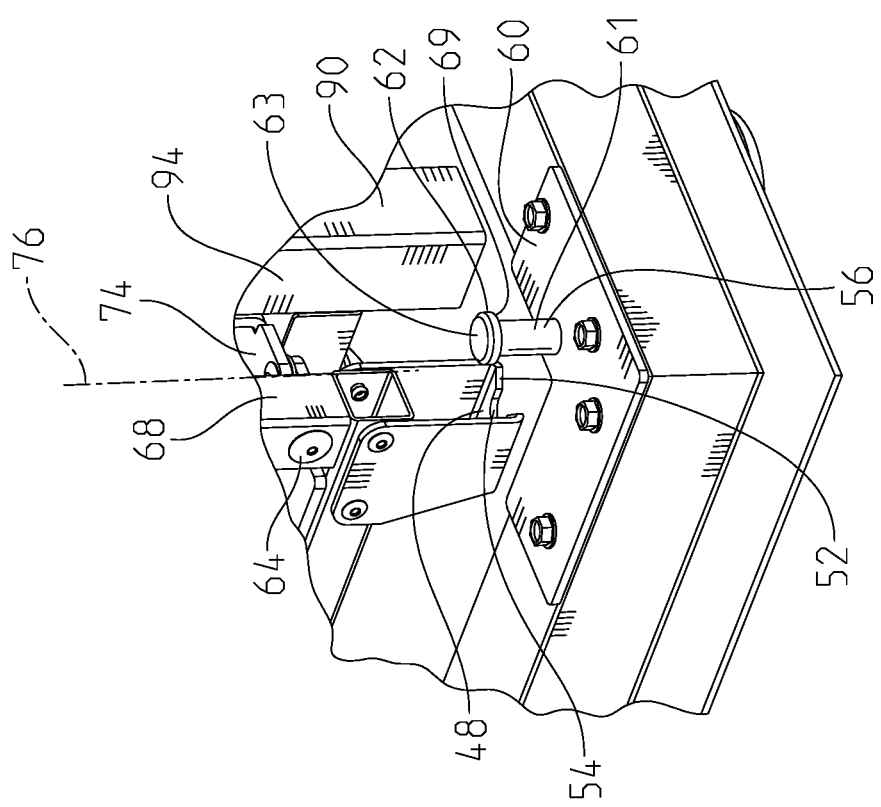

PATIO FOR RAMP DOOR

CROSS REFERENCE TO RELATED APPLICATIONS

This application claims the benefit of U.S. Provisional Application No. 62/506,700, filed May 16, 2017, the disclosures of which are hereby incorporated by reference.

BACKGROUND OF THE INVENTION

Toy hauler recreational vehicles ("RV") use ramp style doors to load and unload additional vehicles into a rearward compartment. When the ramp door is not closed for travel or being used as a loading ramp it may be used as a patio. Often legs extending from the door or cables may support the door parallel to the ground on which the RV is parked. Typically, available patios have flimsy walls that are not well attached to the ramp door. This can be a safety hazard and communicate to the end user of the RV that quality is lacking. There must be a balance between relatively light weight, yet sturdy patio framing that is easy to use and store. In achieving a light weight and easy to use patio, there should be an easy to use connection between the walls of the patio and the ramp door that forms a cohesive rigid structure. This enables the use of lighter patio walls because they derive rigidity through their connection with the structure of the ramp door. Using the structure of the ramp door is advantageous because the ramp door is necessarily sturdy enough to support the weight of other vehicles being driven over the door. Therefore, it is possible to have an extremely rigid and safe patio system that minimizes additional weight to the RV.

SUMMARY OF THE INVENTION

The present invention is a patio for a ramp door. The ramp door is moveable from a closed position to an open extended position. The extended position is fixable parallel to a ground surface. The patio has a first wall that is affixed to a hinge for being fixed with respect to the ramp door. The hinge supports the first wall for pivoting above the ramp door in its extended position. The first wall has a lower edge for being adjacent to and overlying the ramp door in its extended position. A catch plate is located adjacent to the lower edge of the first wall. The catch plate has an opening that extends into a slot. A first kingpin is for being secured to the ramp door. The first kingpin has a major diameter, an undercut, and a shoulder near a distal end. The shoulder is spaced from the ramp door when the kingpin is affixed to the ramp door. The catch plate is moveable to the kingpin so that the slot receives the undercut of the kingpin and the catch plate is retained between the shoulder of the kingpin and ramp door when the undercut is in the first slot.

The patio may also have a second wall hingeably attached to the first wall. The second wall being pivotable above the ramp door in its extended position. The second wall has a second lower edge for being adjacent to and overlying the ramp door in its extended position. A second catch plate is located adjacent to said second lower edge and said second catch plate has a second opening extending into a second slot. The second kingpin is for being secured to the ramp door. The second kingpin has a major diameter, an undercut, and has a shoulder near a distal end. The shoulder is spaced from the ramp door when the second kingpin is affixed to the ramp door. The second catch plate is moveable to the second kingpin so that the second slot receives the undercut of the second kingpin and the second catch late is retained between the shoulder of the second kingpin and the ramp door when the undercut is in the second slot.

BRIEF DESCRIPTION OF THE DRAWINGS

FIG. 6 is a magnified view taken of area 6 in FIG. 4 showing the third wall folded between the first and second walls.

FIG. 7 is a magnified view showing the locking device on the third wall locking to the bar cleat affixed to the ramp door;

FIG. 8 is a magnified view of the locking device shown in FIG. 7 with the locking device in its unlocked position;

FIG. 9 is a rear view of the locking device shown in FIG. 7 with the locking device in the locked position;

FIG. 10 is a rear view of the locking device shown in FIG. 8 with the locking device in the unlocked position;

FIG. 11 is a perspective view of the sliding portion of the first wall approaching the first kingpin;

FIG. 12 is a perspective view of the catch plate affixed to the end of the first sliding portion in its locked position around the first kingpin with the first kingpin not shown for clarity;

DETAILED DESCRIPTION OF THE INVENTION

Figure 1:
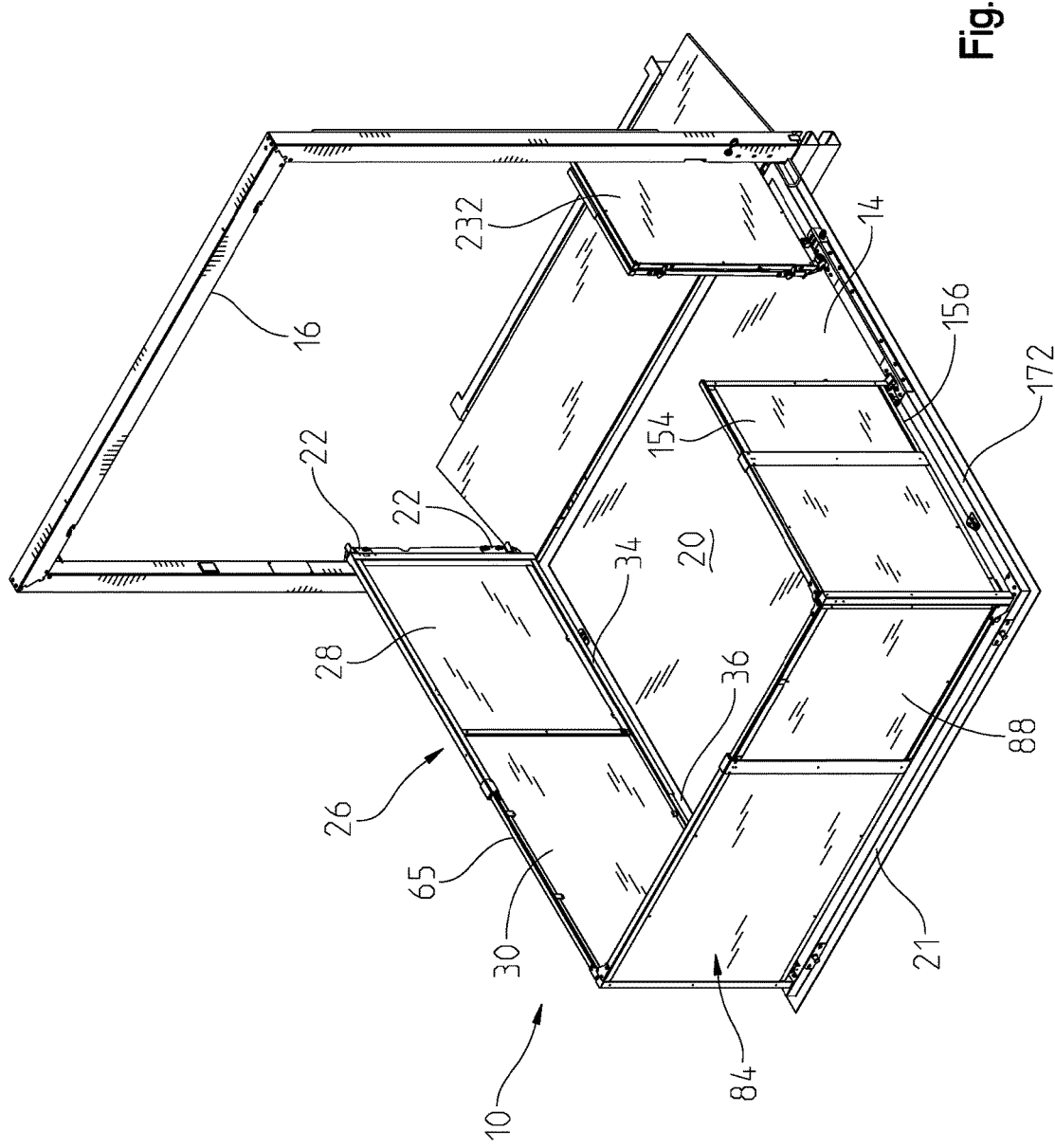
FIG. 1 is a perspective view showing the ramp door suspended over a ground surface with the patio in place.

FIG. 1 is a perspective view of the patio 10 of the present invention being used above a ramp door 14. The ramp door 14 has a door frame 16 that is affixed to a recreational vehicle (not shown) hereinafter "RV." The ramp door 14 is suspended over a ground surface and held parallel to it by jack stands (not shown) or may be suspended over the ground by cables (not shown) attached to the frame 16. A combination of cables and/or jack stands attached to the door 14 may be used to support the door 14 in the position shown in FIG. 1. These may not be the only methods of supporting the ramp door 14 over the ground surface as there may be many methods possible to accomplish this. The ramp door 14 is movable between a closed position, where the upper surface 20 of the door 14 is adjacent to the frame 16, to an open position shown in FIG. 1 where the door is suspended substantially parallel to the ground surface. It is generally understood that the top edge 21 of the ramp door 14 may be lowered to contact the ground surface, but this position of the door 14 that is for loading vehicles in to the RV is not discussed further because it is not relevant to the use of the patio 10 of this invention. The RV can be a towable trailer or a motorized unit and typically, the ramp door 14 and its door frame 16 are affixed to the rear of the vehicle. The patio 10 has first hinges 22 that are affixed to the door frame 16. The first hinges 22 are connected to a first wall 26. The first wall 26 has a first fixed portion 28 and a first sliding portion 30. The first hinges 22 are connected to the first fixed portion 28 of the first wall 26. The first sliding portion 30 is telescopingly received in the first fixed portion 28. The first fixed portion 28 has a lower edge 34 and the first sliding portion 30 has a lower edge 36. The lower edges 34, 36 of the first wall 26 are designed to be suspended over the upper surface 20 of the ramp door 14. To facilitate smooth movement over the upper surface 20 of the ramp door 14 a first caster 40 is affixed to the lower edge 36 of the first sliding portion 30. The first caster 40 facilitates movement in a longitudinal telescoping direction as the first sliding portion 30 is moved longitudinally from a retracted position with respect to the first fixed portion 28 to an extended position shown in FIG. 4. A magnified view of the first sliding position 30 nearly to its extended position is shown in FIG. 11. Additionally, the first caster 40 facilitates smooth pivotal movement from a stowed position of the first wall 26, where the first wall 26 is folded along its frame mounted first hinges 22 into the door frame 16, to an opened position shown in FIG. 4 where the first wall 26 is opened to be aligned near a first lateral edge 44 of the ramp door 14. The first sliding portion 30 includes a first catch plate 48 affixed near the lower edge 36. The first catch plate 48 is shown magnified in FIG. 11 and FIG. 12. The first catch plate 48 has a leading edge 50 and an opening 52 that acts as a funnel into a slot 54. The first catch plate 48 is designed to join a first kingpin 56 that is fixed to the ramp door 14. The first sliding portion 30 has a vertical end member 64 that spans its height to an upper edge 65 to complete the structure of the first wall 26. The end member 64 has an end surface 68 that is aligned with the leading edge 50 of the first catch plate 48. The first kingpin 56 may be contained on a kingpin plate 60 that is bolted to the ramp door 14 (as shown in FIG. 11), which may be useful to fit the first kingpin 56 to a door 14 originally manufactured without a kingpin, or the kingpin 56 may be welded to the door 14 as it is originally manufactured. The first kingpin 56 has an undercut 61 that has a narrower diameter than a major diameter 62. The undercut 61 is near a distal end 63 and forms a shoulder 69. As can be seen in FIG. 11, the shoulder 69 is spaced above the upper surface 20 of the door 14.

Figure 4:
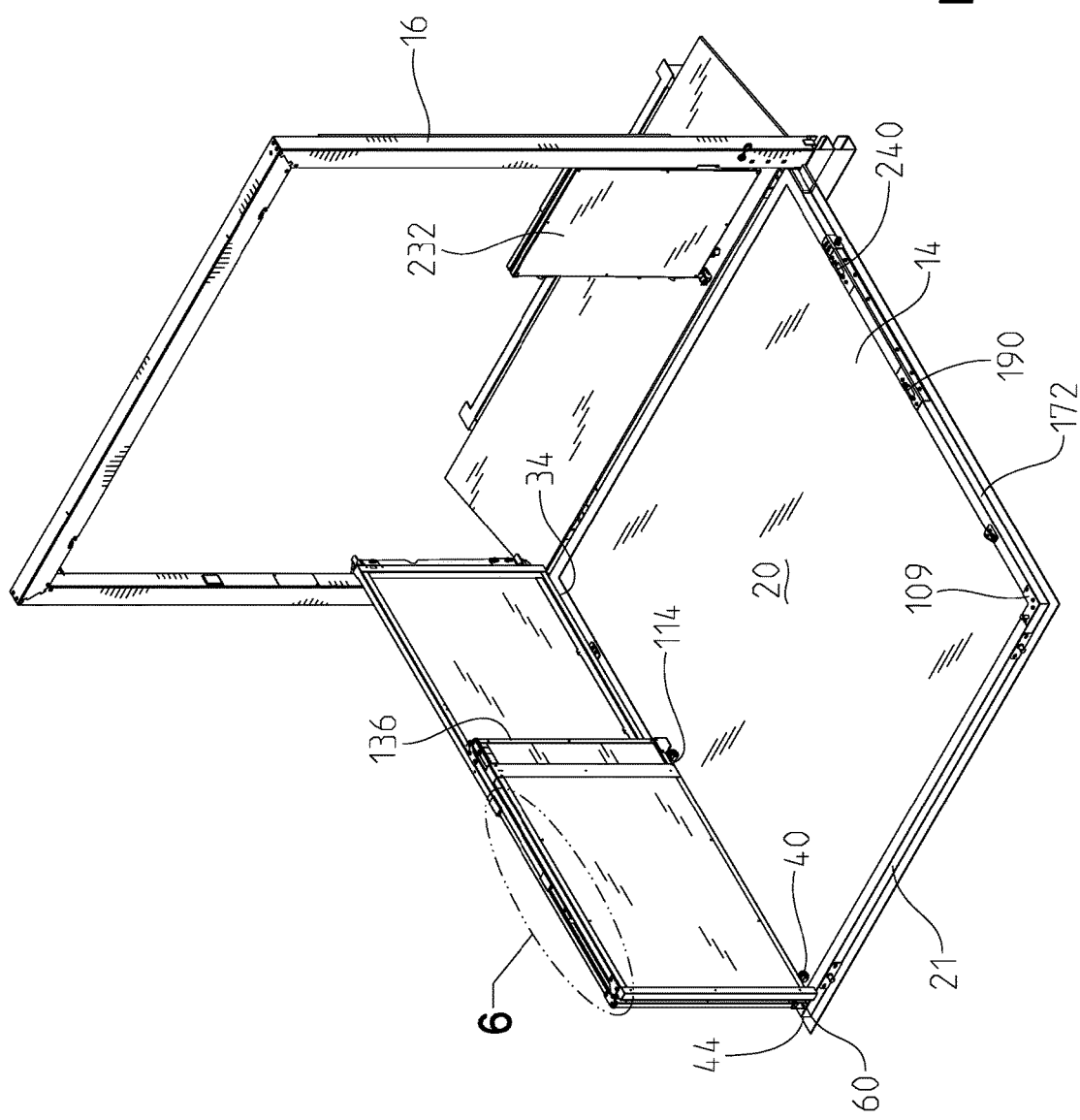
FIG. 4 is a perspective view of the patio shown in FIGS. 1-3 with the third wall folded between the first and second walls.
Figure 5:
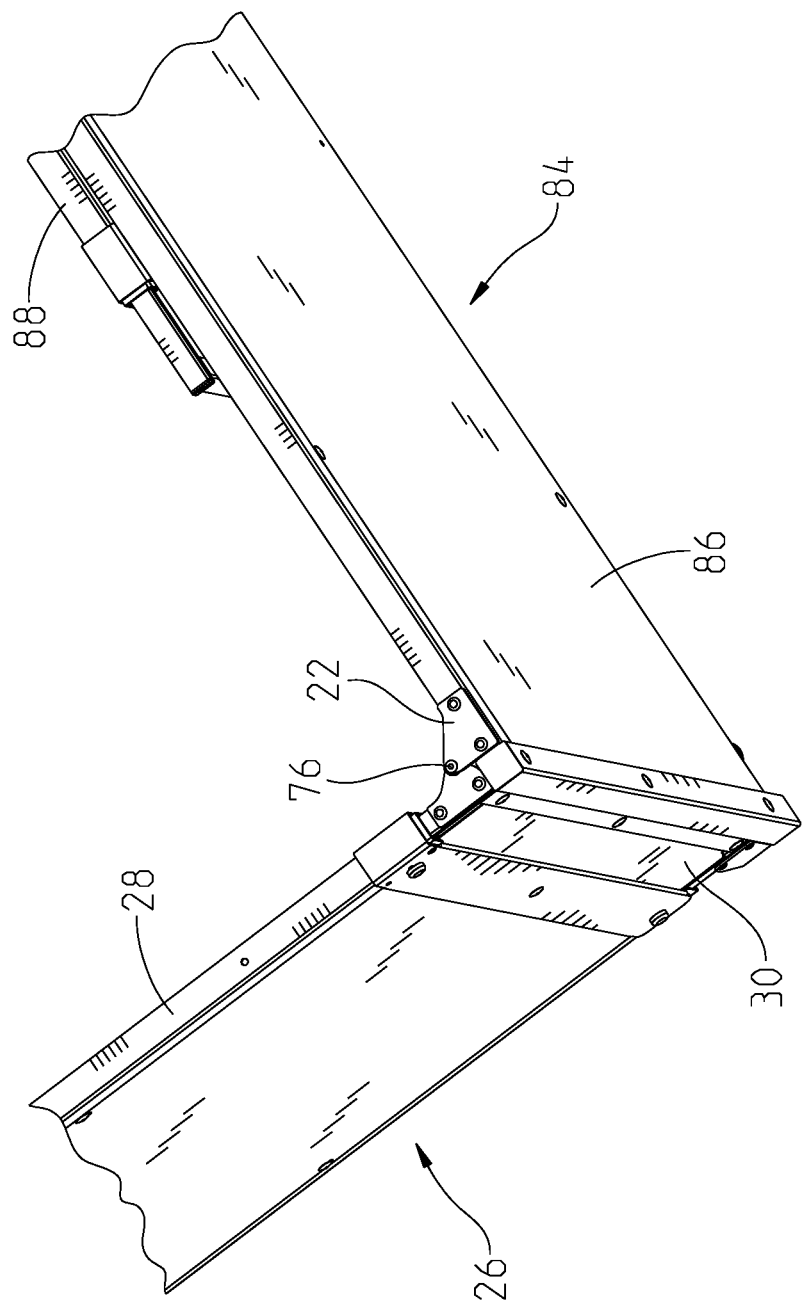
FIG. 5 is a magnified view taken about the second hinges with the second wall pivoted perpendicular to the first wall.

The first wall 26 is connected to a second wall 84 with second hinges 74. The second hinges 74 are located near the top and bottom of the first sliding portion 30. Each of the second hinges 74 has an axis 76 about which the second hinges 74 pivot. The second hinges 74 are connected to a second wall 84 that pivots with respect to the first wall 26. The second wall 84 has a second fixed portion 86 and a second sliding portion 88. The second sliding portion 88 is telescopingly received in the second fixed portion 86. The second fixed portion 86 has a vertical end member 90 that is connected to the second hinges 74. Vertical member 90 has a mating surface 94 that mates with end surface 68 of the first sliding portion 30. The hinge axis 76 is offset so that it is inside of the vertical end member 64 of the first wall 26 and behind the leading edge 50 of the first catch plate 48. In other words, the hinge axis 76 is nearer the first fixed portion 28 than the leading edge 50. The second wall 84 can pivot between a first position where the second wall 84 is adjacent to the first wall 26 (folded position), and a second position (extended position) where the second wall 84 is substantially perpendicular to the first wall 26. The first position is shown in FIG. 4 and the second position is shown in FIG. 1. When the second wall 84 is in its first position shown in FIG. 4, the first catch plate 48 is open as shown in FIG. 11. When the second wall 84 is in its second position, the catch plate 48 is closed as shown in FIG. 12. When the catch plate 48 is open, the first sliding portion 30 can be moved to its extended position shown in FIG. 4 to meet the first kingpin 56. Once the first kingpin 56 is in the slot 54, the second wall 84 can be moved into its second position to close the slot 54 with mating surface 94. When the opening 52 of slot 54 is closed by the mating surface 94 of vertical member 90, the first kingpin 56 is captured within the slot 54. It is contemplated that the slot 54 may open to the first kingpin 56 in a direction other than an axial direction of the first wall 26. This could be accomplished by having the slot be open to either side of the first wall 26 and having the slot 54 pivoted into position to meet the first kingpin 56.

Figure 2:
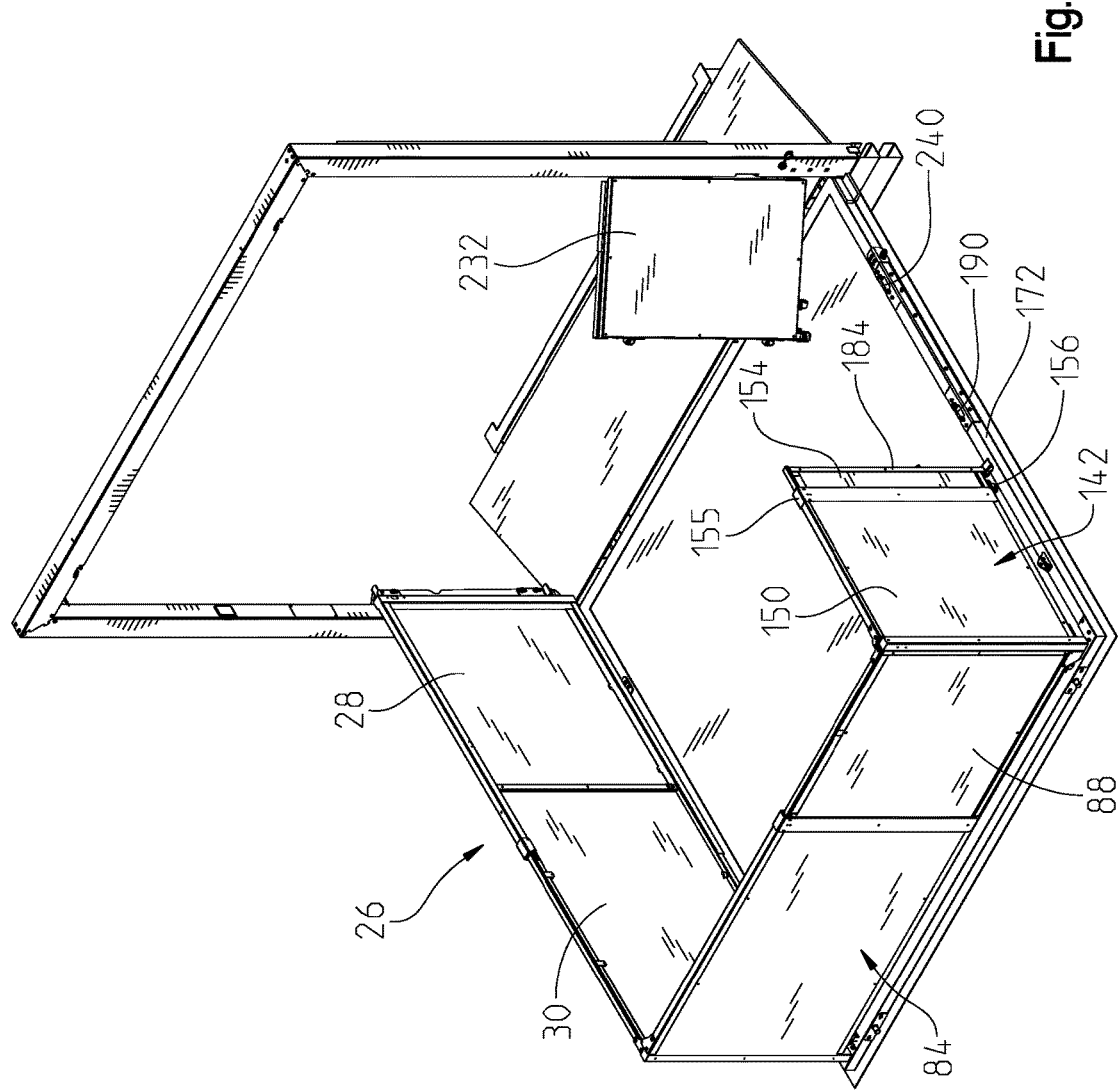
FIG. 2 is a perspective view of the patio shown in FIG. 1 with the stub wall hinged toward the opening in the door frame.
Figure 3:
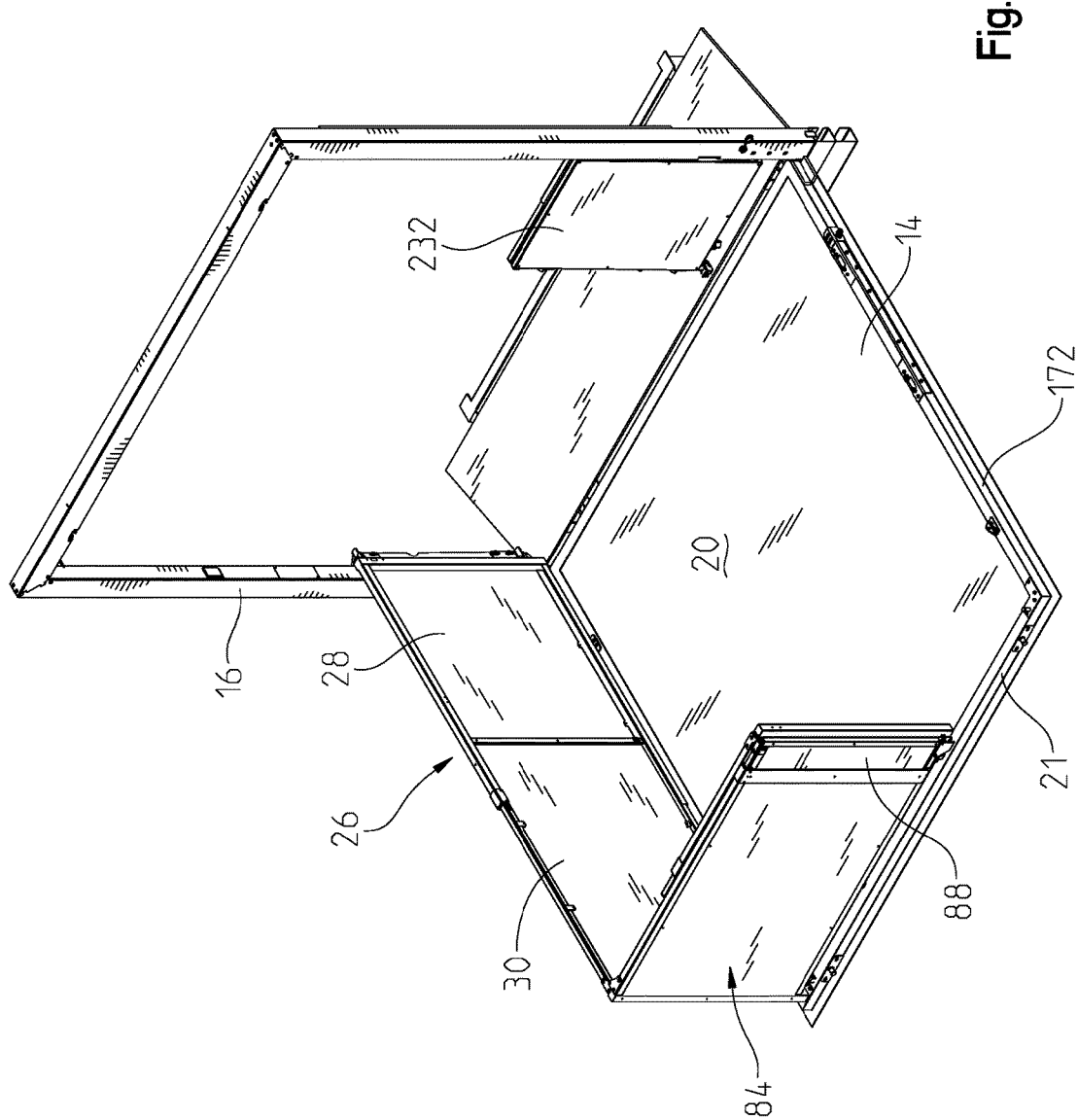
FIG. 3 is a perspective view of the patio shown in FIGS. 1-2 with the stub wall hinged into the ramp opening and the third wall folded against the second wall.

Once the second wall 84 is pivoted into its second position perpendicular to the first wall 26, the second sliding portion 88 may be extended to meet a second kingpin 108 that is affixed to the door 14. The second kingpin 108 is affixed to the door 14 with a second kingpin plate 109. The retracted position of the second sliding portion 88 is shown in FIG. 3, and the extended position of the second sliding portion 88 is shown in FIG. 2. The second sliding portion 88 includes a second catch plate 112 adjacent to its lower edge 114. The second catch plate 112 has an opening 118 and a slot 120. The second sliding portion 88 has a second caster 124 affixed thereto to facilitate smooth movement over the upper surface 20 of the door 14. The second catch plate 112 has a leading edge 130 that is aligned with an end surface 134 of end member 136. End member 136 spans from lower edge 114 to an upper edge 139 of the second sliding portion 88.

Figure 14:
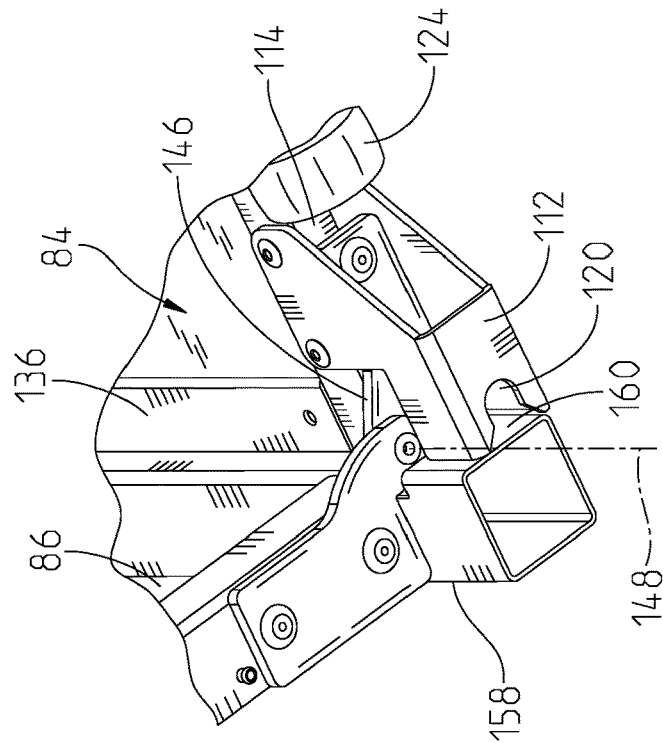
FIG. 14 is a perspective view of the catch plate affixed to the end of the second sliding portion in its locked position around the second kingpin with the second kingpin not shown for clarity.
Figure 13:
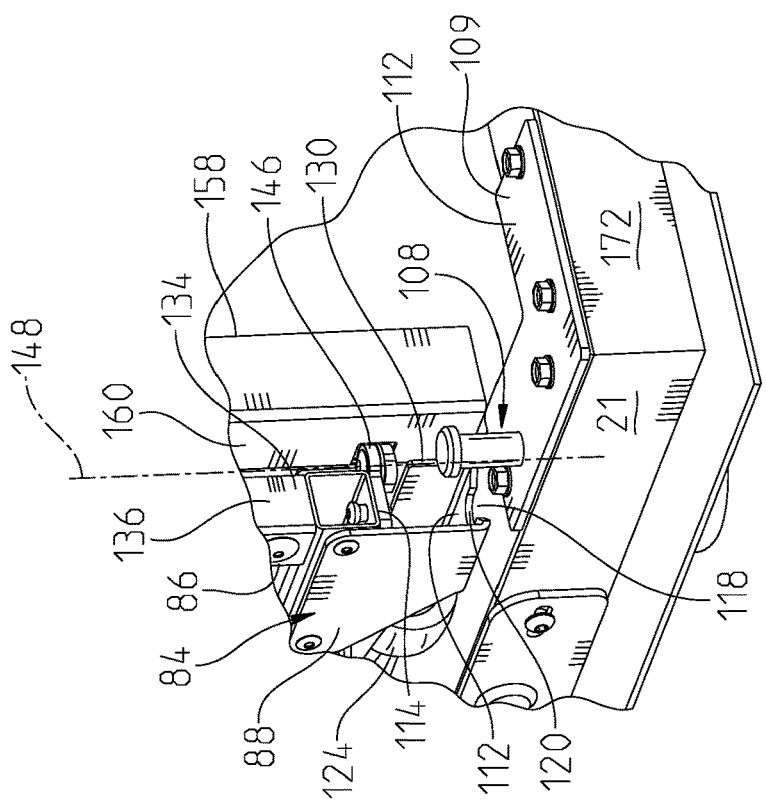
FIG. 13 is a perspective view of the sliding portion of the second wall approaching the second kingpin.
Figure 15:
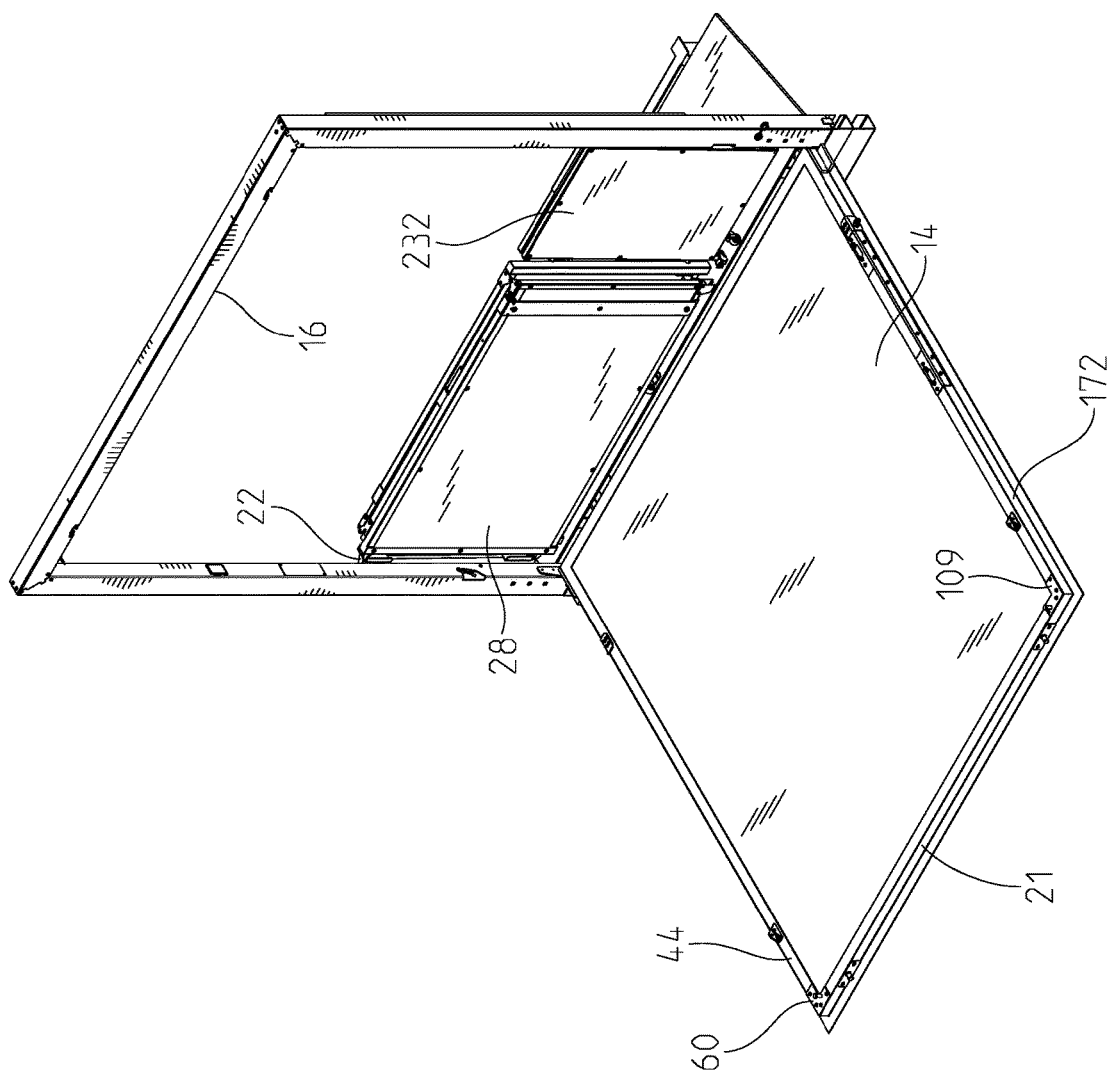
FIG. 15 shows the patio shown in FIG. 1 in its fully stowed position within the door frame.

A third wall 142 is connected to the second wall 84 with third hinges 146. The third hinges 146 are located near the upper and lower edges 139, 114 of sliding portion 88. Each of the third hinges 146 has an axis 148 about which the third hinges 146 pivot. The third wall 142 has a third fixed portion 150 and a third sliding portion 154. The third sliding portion 154 has an upper edge 155 and a lower edge 156. The third sliding portion 154 is telescopingly received in the third fixed portion 150. The third wall 142 pivots about third hinge axis 148. The third wall 142 includes a third caster 143 adjacent to the lower edge 156 of the third sliding portion 154 to facilitate smooth movement of the third wall 142 above the door 14 as it is pivoted about the third hinges 146. The third fixed portion 150 has a vertical member 158 that is connected to the third hinges 146. The vertical member 158 has a mating surface 160 that mates with the end surface 134 of end member 136. The third hinge axis 148 is offset so that it is inside the vertical end member 136 and behind the leading edge 130 of the second catch plate 112. This locates hinge axis 148 nearer the second fixed portion 86 than the leading edge 130. The third wall 142 can pivot between a first position (folded position) with respect to the second wall 84 to a second position (extended position) where the third wall 142 is substantially perpendicular to the second wall 84. The first position of the third wall 142 locates the third wall 142 adjacent to the second wall 84, as shown in FIGS. 3 and 4. The second position of the third wall 142 that locates the third wall 142 perpendicular to the second wall 84 is shown in FIG. 1. The first position is shown in FIG. 4. In the configuration shown in FIG. 4, the third wall 142 is not only adjacent to the second wall 84, but is also adjacent to the first wall 26. In other words, it is possible to fold the third wall 142 to be contained between the first wall 26 and second wall 84. When the third wall 142 is in its first position, the catch plate 112 is open as shown in FIG. 12. When the third wall 142 is in its second position, the opening 118 on the second catch plate 112 is closed as shown in FIG. 14. When the second catch plate 112 is open, the second sliding portion 88 of the second wall 84 can be moved to its extended position shown in FIG. 2 to meet the second kingpin 108. Once the second kingpin 108 is in the slot 120, the third wall 142 can be moved into its second position, perpendicular to the second wall 84, to close the slot 120 with mating surface 160. When the slot 120 is closed with the mating surface 160 of vertical member 158, the second kingpin 108 is captured within the slot 120.

Movement of third wall 142 to its second position also positions the third sliding portion 154 of the third wall 142 along second lateral edge 172 of the door 14. The sliding portion 154 of the third wall 142 is positioned so its vertical end member 184 is adjacent to a bar cleat 190 near lateral edge 172 of the door 14. A locking device 194 is near the end of the sliding portion 154. The locking device 194 has a retainer body 196 that straddles the vertical end member 184 and pivots about a bolt 200 that extends through the vertical end member 184 to both sides of the retainer body 196. The retainer body 196 has a catch portion 210 that is outside of the vertical end member 184 and an actuation portion 212 that is inside of the vertical end member 184. The catch portion has a catch surface 214 and a ramped surface 216 that is opposite the catch surface 214. The catch surface faces the vertical end member 184. The actuation portion 212 has a tab 218. A tension spring 220 is connected to the tab 218 and vertical end member 184 as shown in FIGS. 9 and 10. The retainer body 196 is pivotable between a first position shown in FIG. 7 and a second position shown in FIG. 8. The first position corresponds to the actuation portion 212 being in a raised position with respect to the vertical end member 184, which locates the catch portion 210 in a relatively lower position. The second position of the retainer body 196 corresponds to the actuation portion 212 and its tab 218 in a lowered position with respect to the vertical end member 184, which locates the catch portion 210 in a relatively raised position. This second position of the retainer body 196 corresponds to an unlocked position, which is shown in FIG. 8. A tension spring 220 biases the retainer body 196 into its first locked position. In addition to straddling the vertical end member 184, the retainer body 196 straddles a hold down tab 221 that fits between catch surfaces 214 as shown in FIG. 7.

The retainer body 196 is designed to catch a bar cleat 190 that is affixed to the door 14 near second lateral edge 172. The first position of the retainer body 196 corresponds to a locked position. In its locked position, the retainer body 196 captures the bar cleat 190 between the catch surfaces 214 and vertical end member 184. When the third wall 142 is pivoted toward the bar cleat 190, the ramped surfaces 216 ride up against the bar cleat 190 to move the retainer body 196 toward its second position so the retainer body 196 can ride over the bar cleat 190. Once the retainer body 196 has moved over the bar cleat 190, the spring 220 biases the retainer body 196 to locked position so that the bar cleat 190 is captured between the catch surfaces 214 and the vertical end member 184. Additionally, the hold down tab 221 prevents the third wall 142 from being lifted off of the bar cleat 190 away from the door 14. This is because hold down tab 221 is longer than the distance between catch surfaces 214 and the vertical end member 184 which locates the hold down tab 221 between the bar cleat 190 and the door 14. Thus, the bar cleat 190 is straddled by the retainer body 196 and hold down tab 221. This relationship corresponding to the locked position is shown in FIG. 7. Pushing down on the tab 218 moves the retainer body into its second unlocked position shown in FIG. 8 and locates the ramped surface 216 and catch surface 214 above the bar cleat 190.

A fourth set of hinges 230 affixes a stub wall 232 to the door frame 16. The stub wall 232 hinges much like the third wall 142. The stub wall 232 has a locking device 236 that functions like locking device 194. Locking device 236 mates with bar cleat 240 on the ramp door 14 to secure its locked position shown in FIG. 1.

Figure 16:
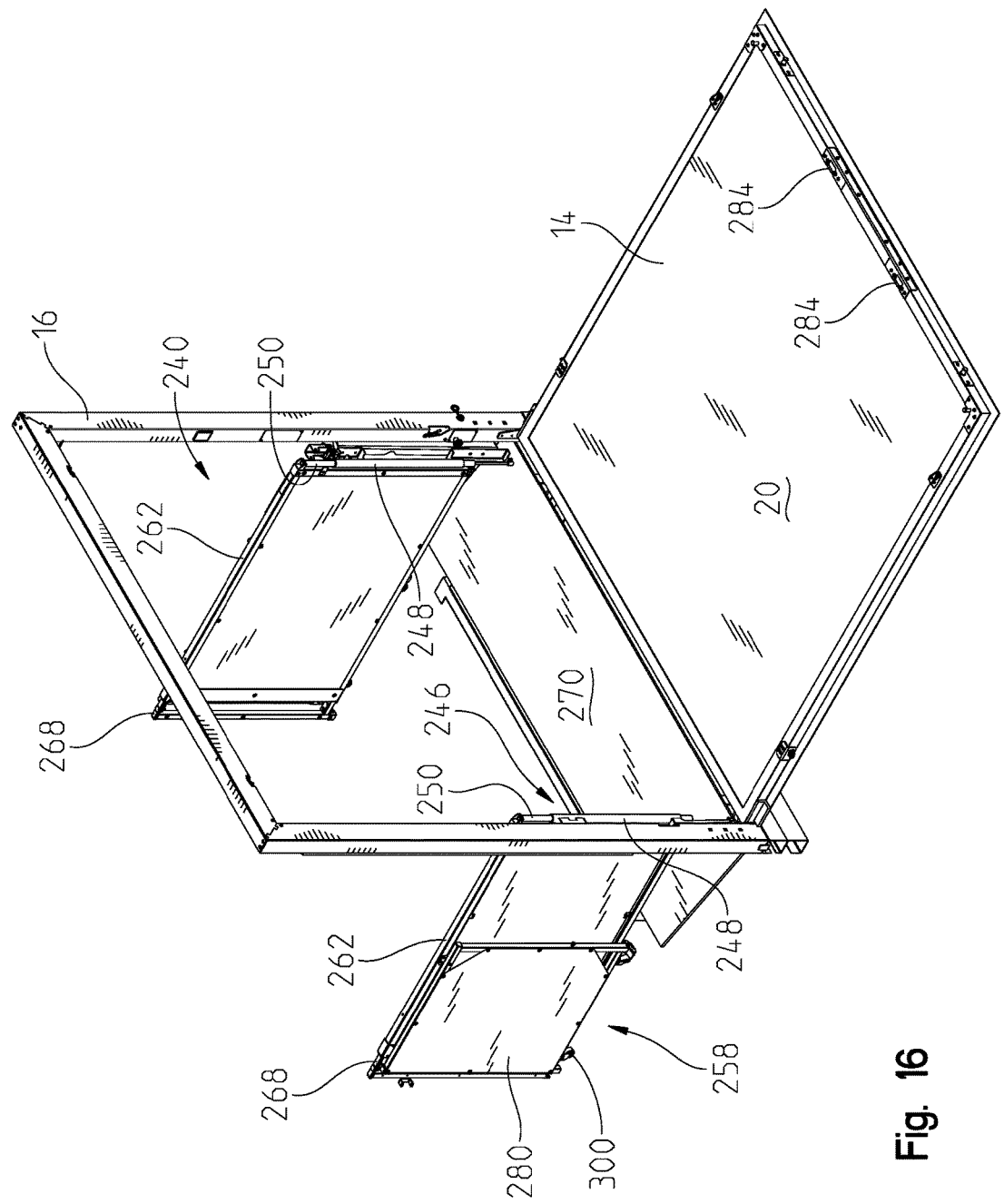
FIG. 16 is a perspective view of a patio having a vertically moveable pivoting hinge with the walls of the patio stored adjacent to the RV walls.
Figure 17:
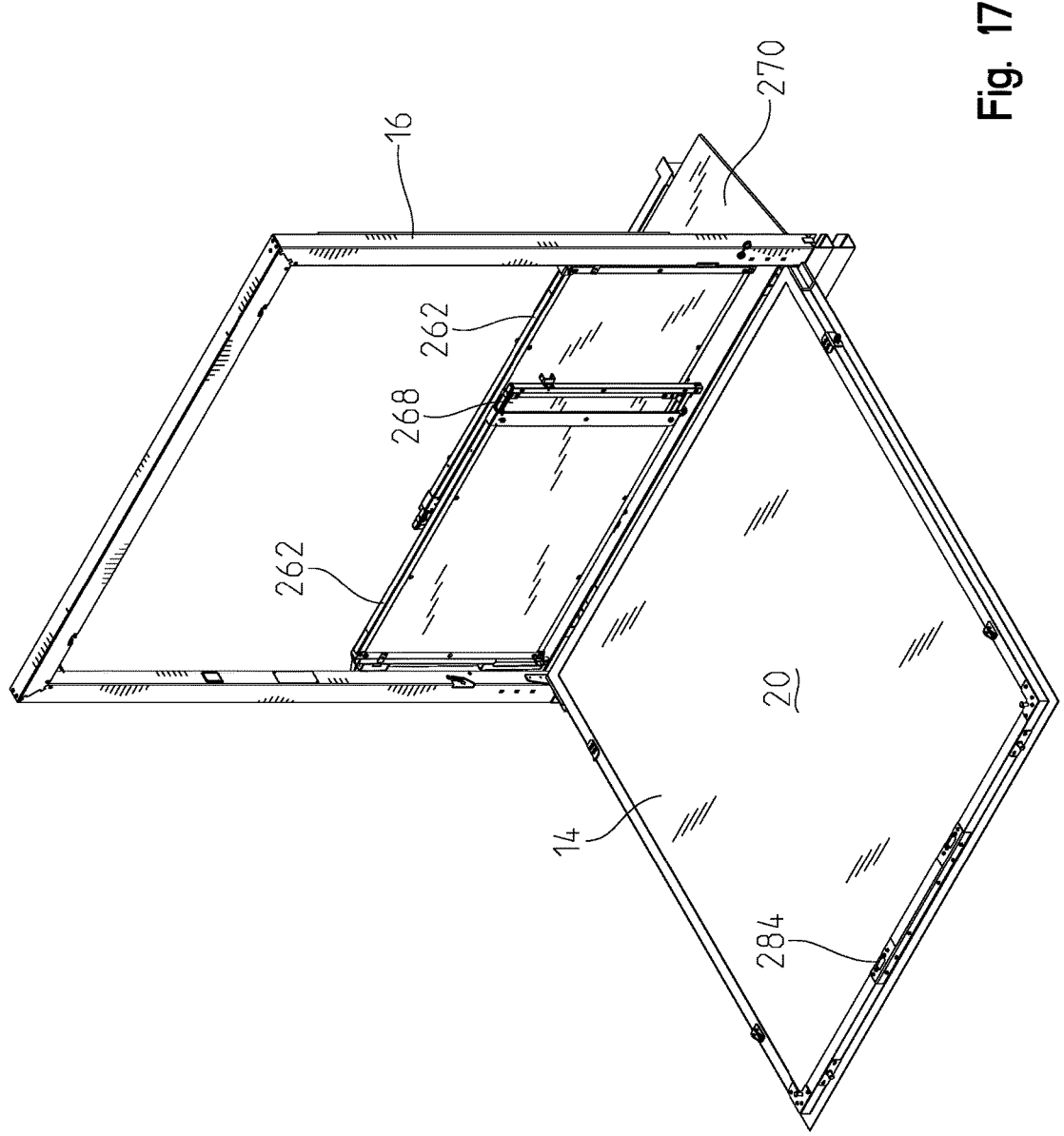
FIG. 17 is a is a perspective view of the patio in FIG. 16 with the walls of the patio stored directly behind the ramp door.
Figure 18:
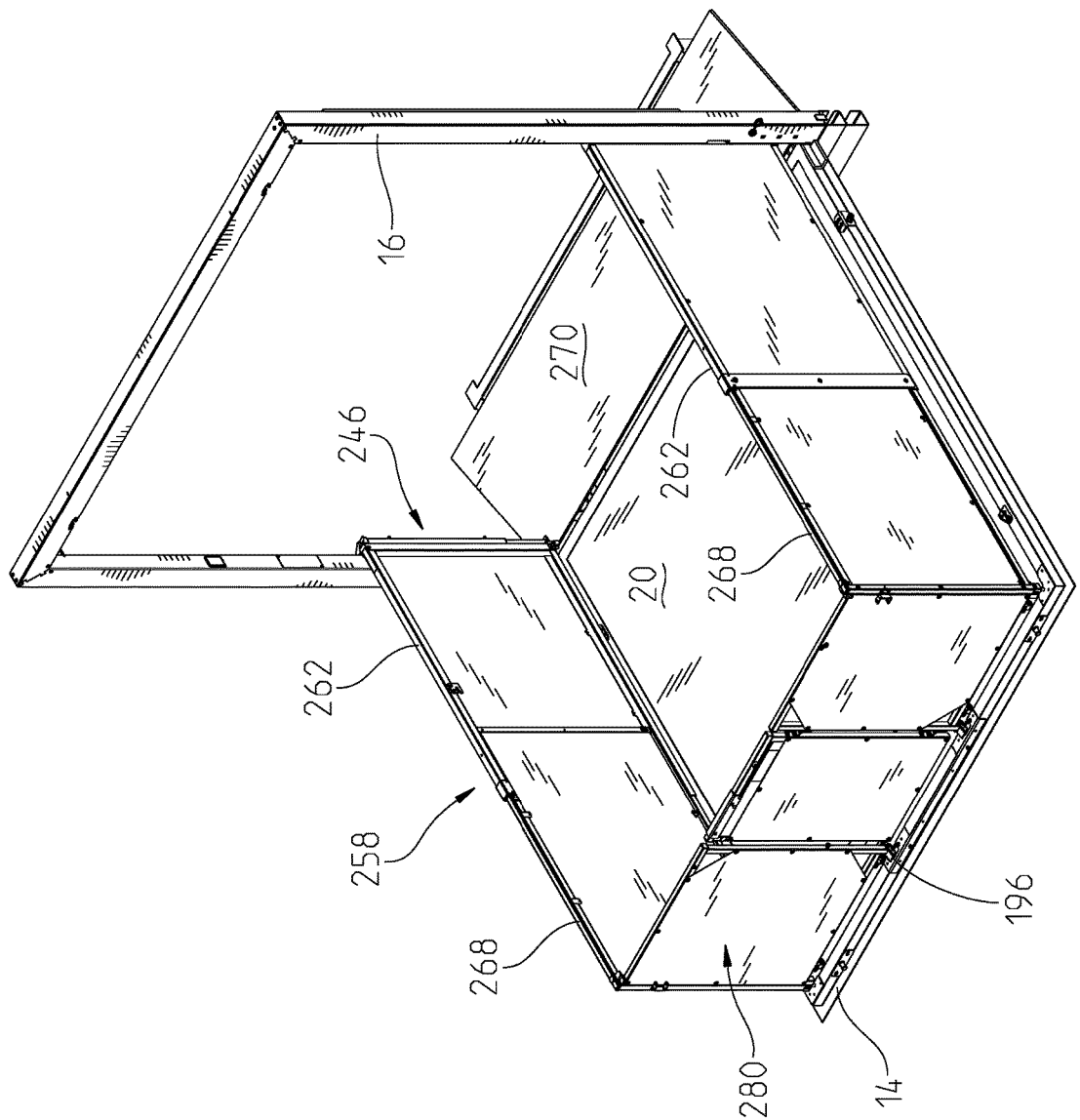
FIG. 18 is a perspective view of the patio shown in FIGS. 16 and 17 with the patio walls fully deployed.
Figure 19:
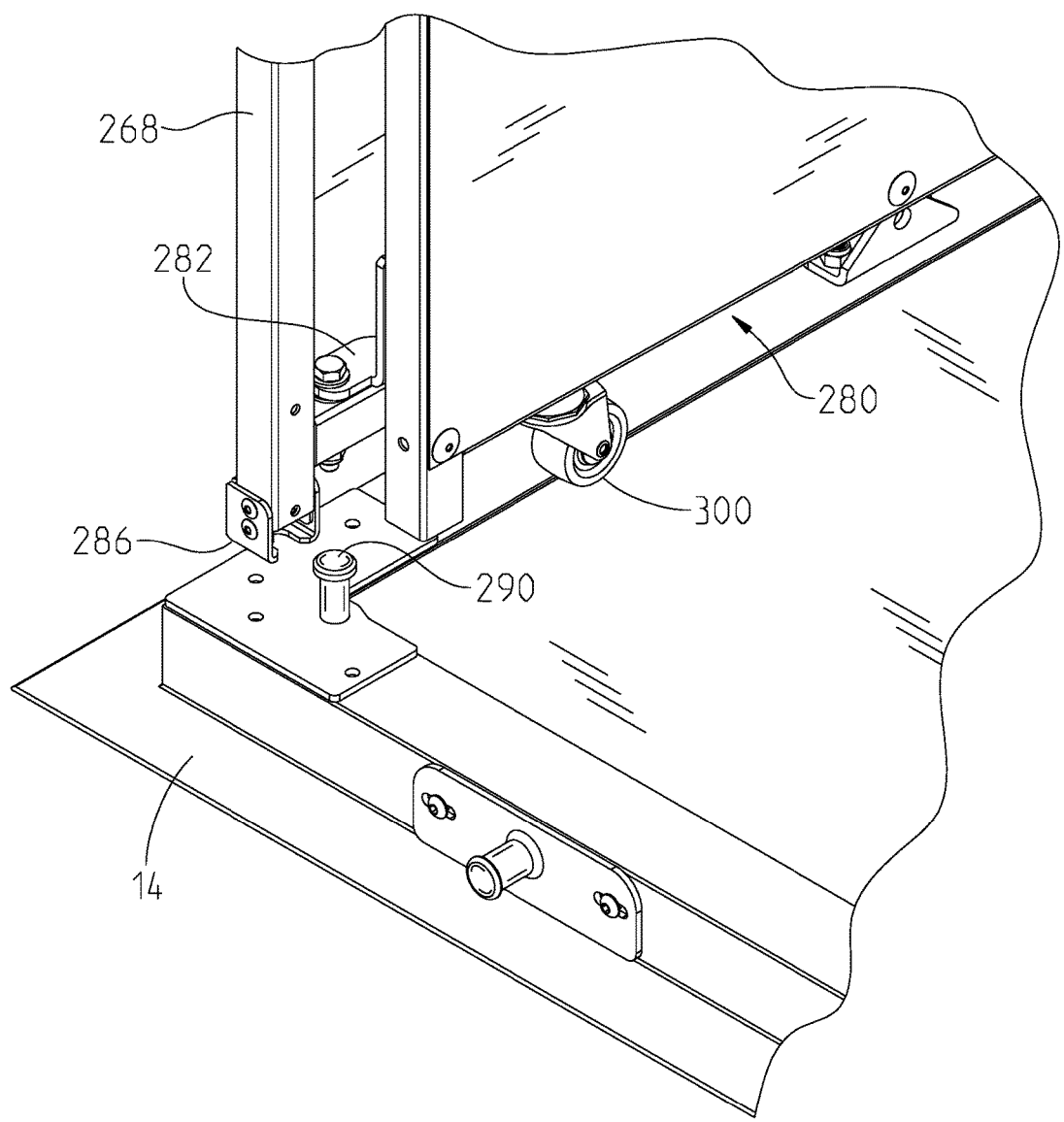
FIG. 19 is a magnified view of a corner of the patio shown in FIGS. 16-18 with the catch plate approaching the kingpin on the ramp door.
Figure 20:
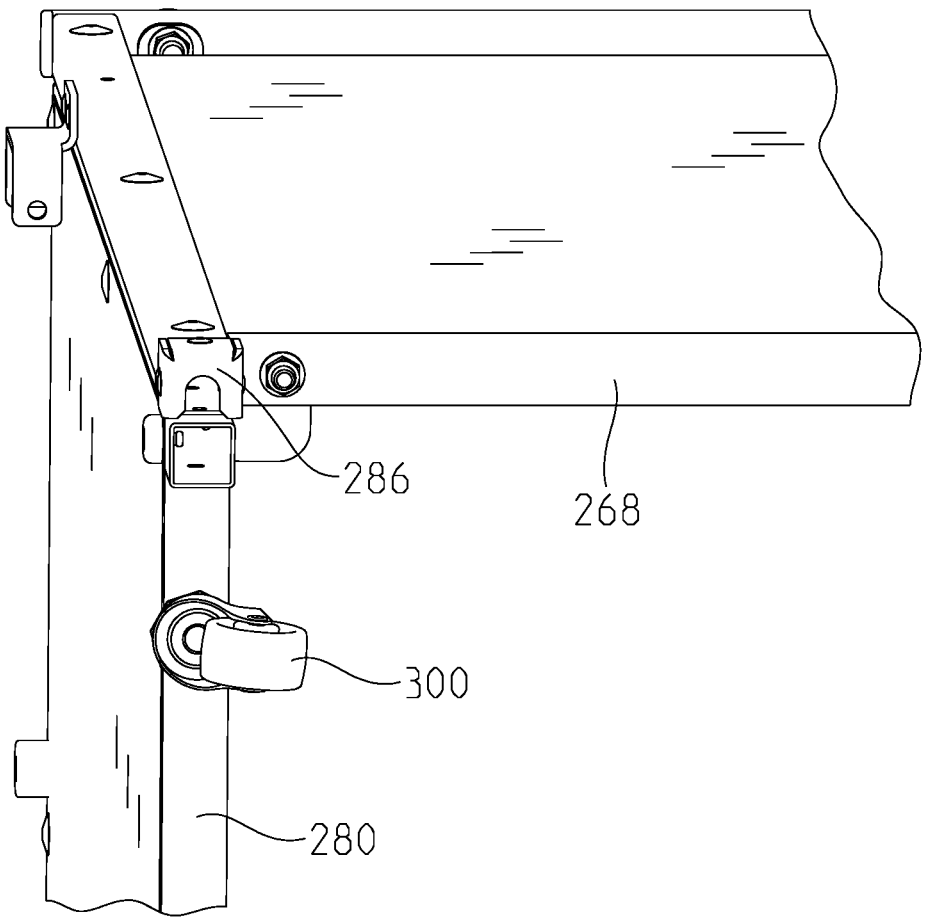
FIG. 20 is a magnified view of the corner of the patio shown in FIG. 19 with the catch plate being closed by the adjacent patio wall so that the kingpin is retained within the catch plate (kingpin not shown)
Figure 21:
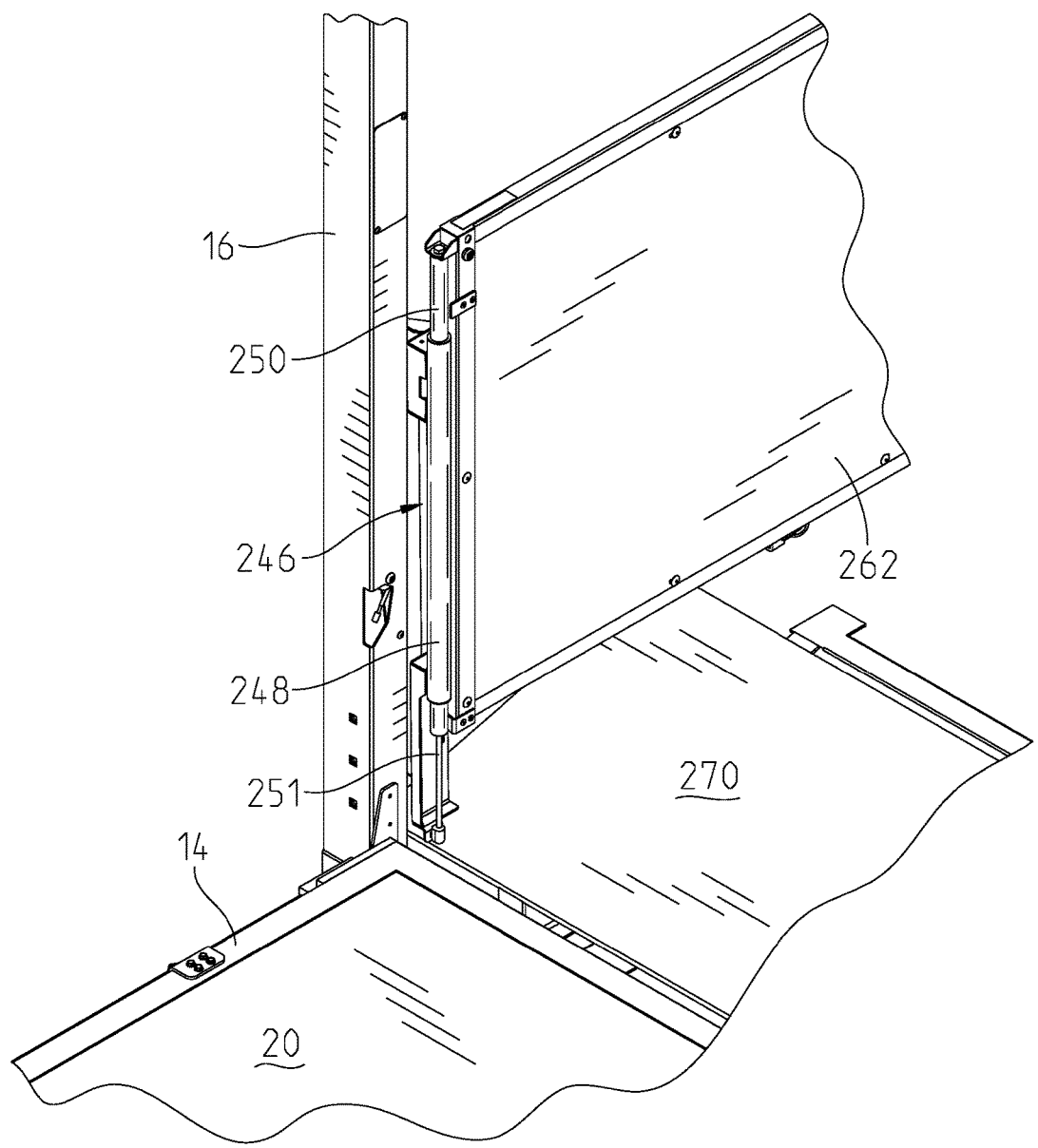
FIG. 21 is a magnified view of the patio shown in FIGS. 16-20 with the walls of the patio in the position shown in FIG. 16 and showing the vertically moveable pivoting hinge in its raised position.
Figure 22:
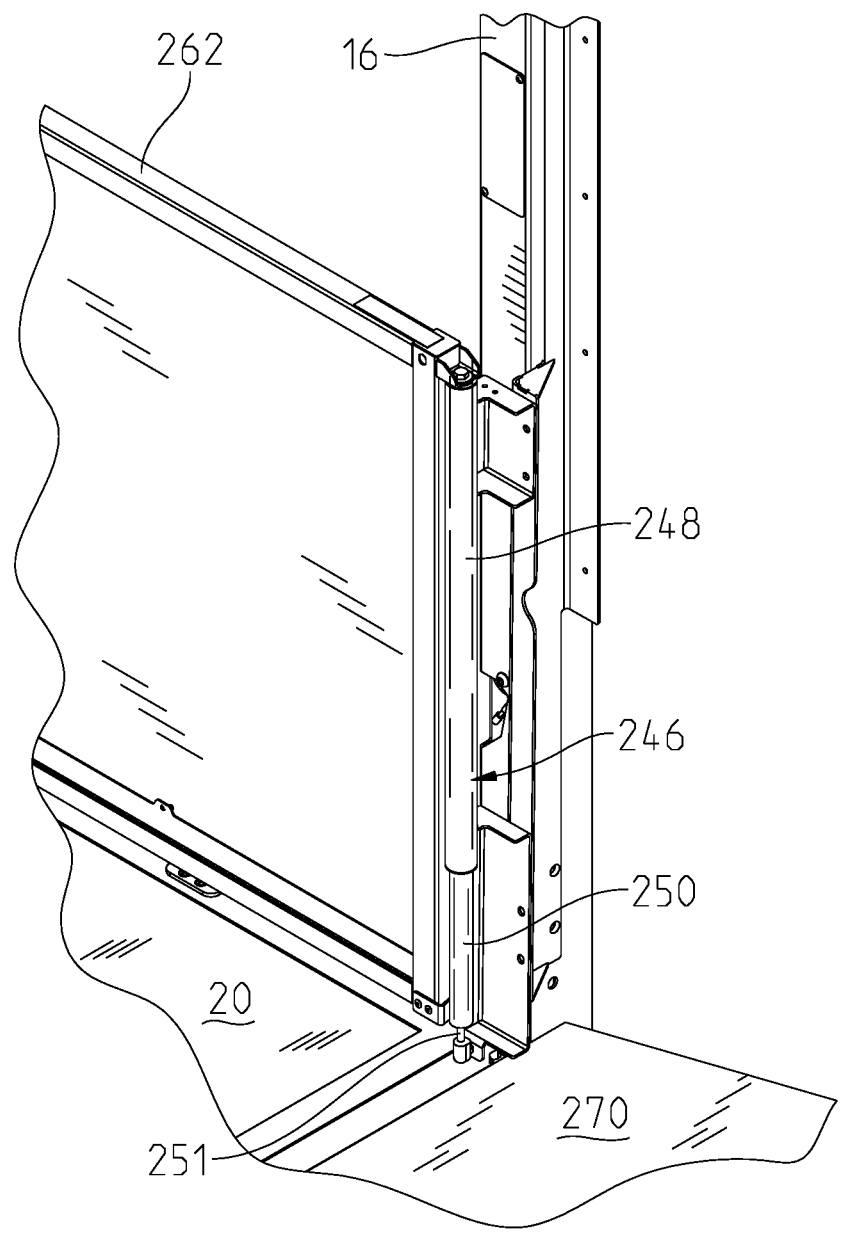
FIG. 22 is a magnified view of the patio shown in FIGS. 16-21 with the walls of the patio in the fully deployed position as shown in FIG. 18 that shows the vertically moveable pivoting hinge in its lowered position.

FIG. 16 shows a patio 240 that is largely symmetrical and functions in substantially the same fashion as the patio 240 shown in FIGS. 1-15. In addition to the functions described above, the patio 240 has the capacity to shift vertically via vertically moveable pivoting hinges 246. Each hinge 246 acts as a linear bearing having a body 248 that is fixed with respect to the frame 16 and a rod 250 that pivots with respect to the body 248 and moves axially within the body 248. The rods 250 are assisted upwardly with a gas spring 251, but it is contemplated that the gas spring 251 could be another type of mechanical spring. The hinges 246 have a lowered position shown in FIG. 22 where the rods 250 are at their lowest point within the body 248, and the hinges 246 have a raised position shown in FIG. 21 where the rods 250 are in their highest positions with respect to their corresponding bodies 248. The rods 250 of the hinges 246 are each connected to walls 258 that pivot in their entirety with respect to the frame 16. Each wall 258 has a fixed portion 262 and a sliding portion 268. Vertical movement of the walls 258 is particularly useful when the walls 258 are used near a beavertail 270 of an RV. The beavertail 270 is a portion of the RV floor that ramps upwardly to a relatively higher area of the floor that is above the surface 20 of the ramp door 14. The walls 258 have a first position that is shown in FIGS. 16 and 21 where the walls 258 are located adjacent to the walls of the RV for storage. The RV walls are not shown for clarity. The walls 258 may be pivoted to a second position where they are in their fully deployed position as shown in FIG. 18. The walls 258 may be pivoted to a third position, between the first and second positions, where they are stored directly behind the ramp door 14 as shown in FIG. 17. The springs 251 bias the rods 250 and walls 258 upwardly, but do not provide enough force to lift the walls 258. The springs 251 provide a significant upward force that is slightly less than the overall weight of the walls 258. As such, when the walls 258 are moved between their first, second, and third positions, a user moving the walls 258 will need very little effort to move the walls 258. Each wall 258 is attached to a second wall 280 with a hinge 282. The hinges 282 are attached the sliding portions 268 of the walls 258. The second walls 280 do not have a sliding portion and fold substantially perpendicular to walls 258. As mentioned above, it is possible for the catch plate 286 to approach the kingpin 290 differently that the catch plates 48 and 112 discussed above. As shown in FIG. 19, Catch plate 286 approaches kingpin 290 from the side, then as the second wall 280 is closed adjacent to the sliding portion 268 of wall 258, the kingpin 290 is captured in the same manner as described above. As shown in FIG. 19, the end of the second wall 280 is secured to a bar cleat 284 with a retainer body 196 as described above. Either of the second walls 280 may have a gate 296 hinged from it. As a user moves the walls 258 from their first position to their second position, casters 300 attached to the second walls 280 ride along the floor of the RV (not shown), down the beavertail 270 and onto the ramp door 14 itself. During movement between the positions, the gas springs 251 and casters 300 facilitate an extremely smooth movement through all positions of the patio 240.

Figure 23:
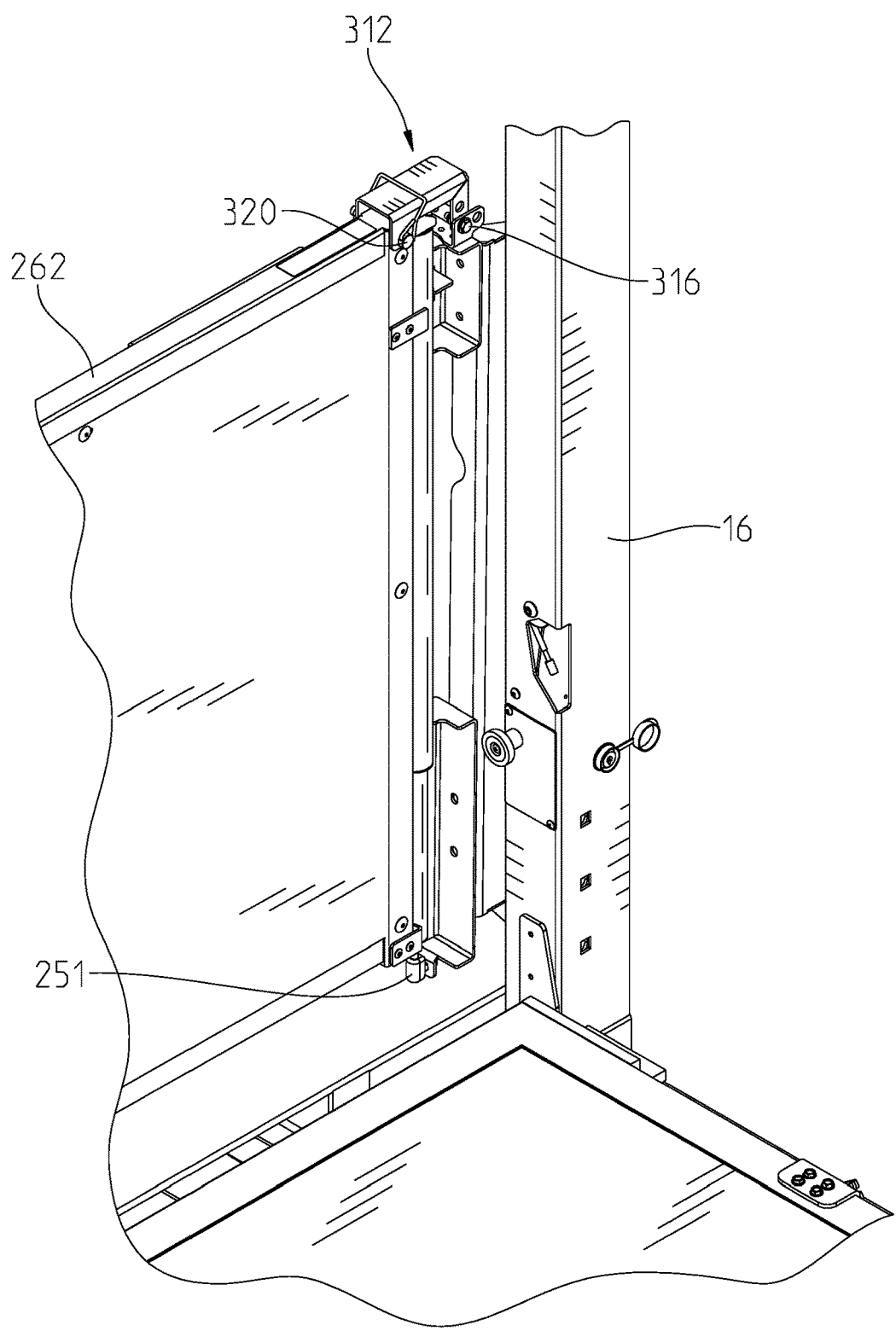
FIG. 23 shows the locking saddle restraining a wall of the patio shown in FIGS. 16-22.
Figure 24:
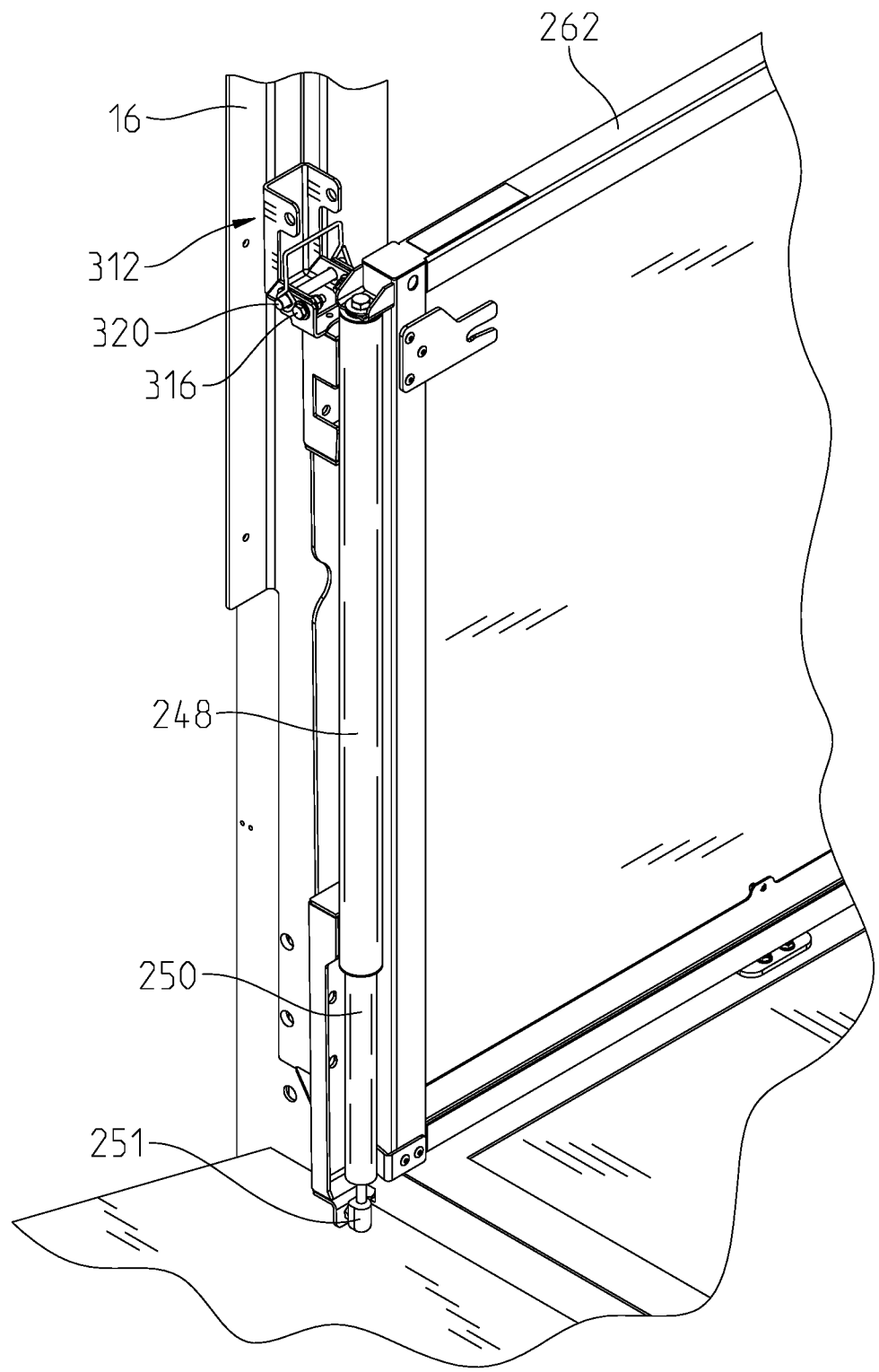
FIG. 24 shows the locking saddle shown in FIG. 23 in its unlocked position with the wall of the patio in its deployed position with the rod of the hinge in its lowest position.
Figure 25:
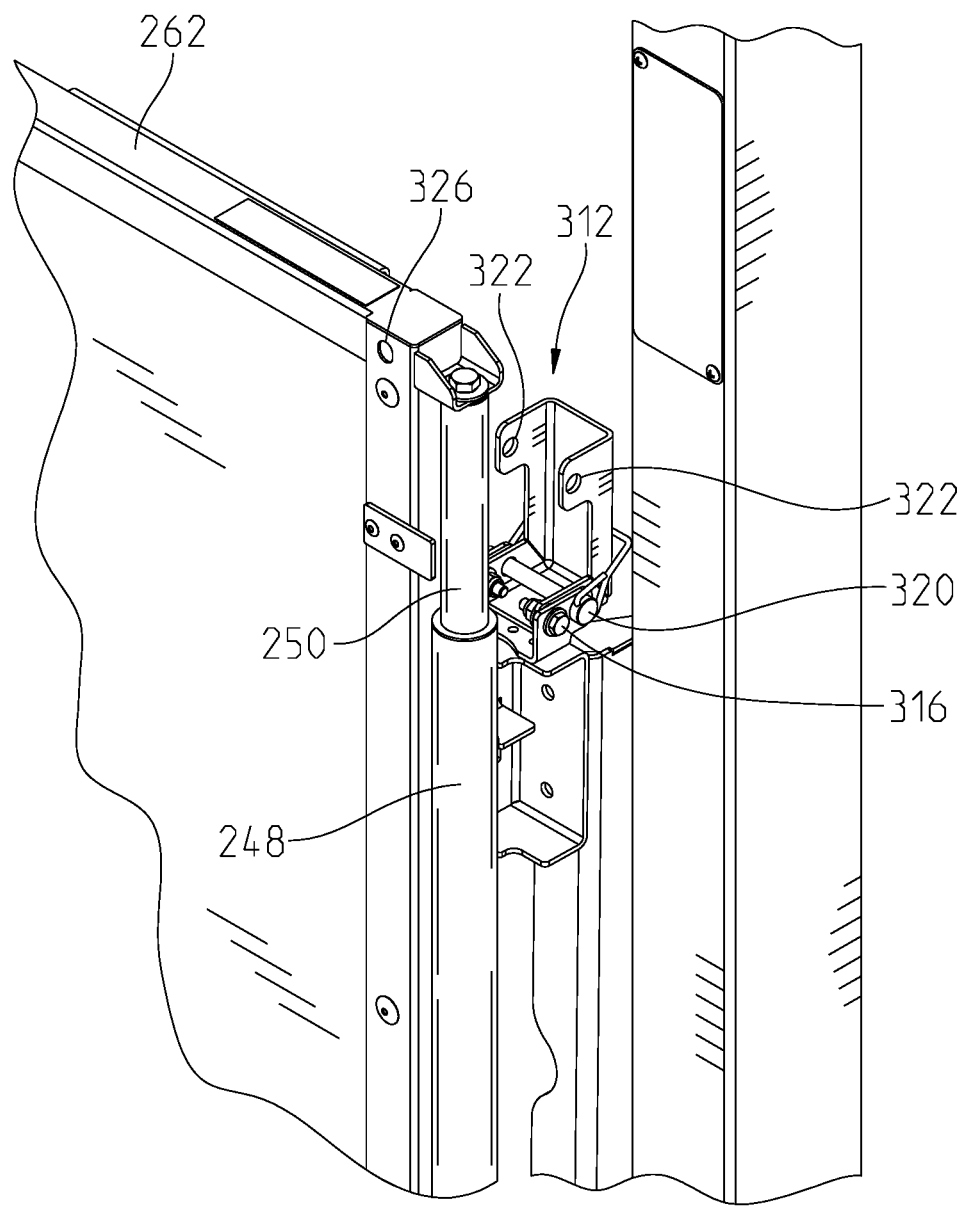
FIG. 25 shows the locking saddle in FIGS. 23 and 24 in its unlocked position with the wall of the patio in its raised position with the rod of the hinge in its highest position, this corresponds the location of the wall being that as shown in FIG. 16.

As mentioned above, the walls 258 are biased upwardly by the springs 251 and in the third position this may present a problem during travel. During travel with the walls 258 in their third position, bouncing of the RV can cause the walls 258 to migrate upward. This is not a problem in the first position because when the walls 258 are adjacent to the walls of the RV, the rods 250 are in their highest position with respect to the bodies 248 and will not travel higher. When the walls 258 are in their third position, the walls may be locked so the rods 250 are in their lowermost vertical position. The rods 250 are also in the lowermost vertical position when the walls 258 are pivoted into their second position (fully deployed position). The locking of the walls 258 is accomplished by a locking saddle 312 located near the hinges 246 on each side of the frame 16. FIGS. 23-25 show the locking saddle 312 in detail. The locking saddle 312 has a pivot pin 316 and a locking pin 320. The pivot pin 316 is locked with respect to the hinge body 248 and allows the saddle 312 to pivot with respect to the frame 16 and body 248. The saddle 312 is pivotable from a locked position shown in FIG. 23 to an unlocked position shown in FIGS. 24 and 25. The locking pin 320 may be used to hold the saddle 312 in the unlocked position as shown in FIG. 24. The opposite end of the saddle 312 from the pivot pin 316 is where the locking pin 320 is inserted through holes 322 in the saddle 312 and holes 326 in the wall 258. The saddle 312 straddles the wall 258 which prevents pivotal movement of the wall 258 and also prevents upward movement of the wall 258 with respect to body 248 when the locking pin 320 is inserted through aligned holes 322, 326 in the saddle 312 and wall 258 respectively.

The invention is not limited to the details above, but may be modified within the scope of the following claims.

What is claimed is:

1. A patio for a ramp door being movable from a closed position to an open extended position fixable substantially parallel to a ground surface, said patio comprising:
   a first wall affixed to a hinge for being fixed with respect to said ramp door, said hinge supporting said first wall for pivoting above said ramp door in its extended position, said first wall having a lower edge for being adjacent to and overlying said ramp door in its extended position, a catch plate located adjacent to said lower edge and said catch plate having an opening extending into a first slot;
   a first kingpin for being secured to said ramp door, said first kingpin having a major diameter, an undercut, and having a shoulder near a distal end, said shoulder being spaced from said ramp door when said kingpin is affixed to said ramp door, said catch plate being movable to said kingpin so that said slot receives said undercut of said kingpin and said catch plate being retained between said shoulder of said kingpin and said ramp door when said undercut is in said first slot.

2. The patio of claim 1 further comprising:
   a second wall hingeably attached to said first wall, said second wall pivotable above said ramp door in its extended position, said second wall having a second lower edge for being adjacent to and overlying said ramp door in its extended position, a second catch plate located adjacent to said second lower edge and said second catch plate having a second opening extending into a second slot;
   a second kingpin for being secured to said ramp door, said second kingpin having a major diameter, an undercut, and having a shoulder near a distal end, said shoulder being spaced from said ramp door when said second kingpin is affixed to said ramp door, said second catch plate being movable to said second kingpin so that said second slot receives said undercut of said second kingpin and said second catch plate being retained between said shoulder of said second kingpin and said ramp door when said undercut of said second kingpin is in said second slot; a third wall hingeably attached to said second wall, said third wall pivotable above said ramp door in its extended position.

3. The patio of claim 1 further comprising:
   a second wall hingeably attached to said first wall, said second wall pivotable above said ramp door in its extended position, said second wall having a second lower edge for being adjacent to and overlying said ramp door in its extended position said second wall being pivotable between a folded position with respect to said first wall and an extended position with respect to said first wall, said second wall closing said opening of said catch plate when said second wall is in said extended position with respect to said first wall.

4. The patio of claim 3, wherein one of said walls includes a locking device including a retainer body pivotable with respect said one wall between an unlocked position and a locked position, said retainer body including a catch surface for catching a bar cleat affixed to said ramp door.

5. The patio of claim 4, wherein said locking device includes a tab opposite said retainer body.

6. The patio of claim 4, wherein said locking device includes a spring biasing said locking device into said locked position.

7. The patio of claim 6, wherein said locking device includes a ramped surface opposite said catch surface, said ramped surface for riding over said bar cleat.

8. The patio of claim 7 wherein said locking device includes a tab opposite said retainer body.

9. The patio of claim 1, wherein said hinge provides axial and pivotal movement of said first wall.

10. The patio of claim 9, wherein said hinge includes a spring for biasing said hinge axially in a direction to lift said first wall.

11. The patio of claim 9, further comprising a second wall hingeably attached to said first wall, said second wall pivotable above said ramp door in its extended position, said second wall having a second lower edge for being adjacent to and overlying said ramp door in its extended position said second wall being pivotable between a folded position with respect to said first wall and an extended position with respect to said first wall, said second wall closing said opening of said catch plate when said second wall is in said extended position with respect to said first wall.

12. The patio of claim 10, wherein said patio includes a locking device pivotally fixed with respect to said hinge and restraining axial movement of said first wall with respect to said hinge.

13. The patio of claim 12, wherein said locking device is a pivotable saddle straddling said first wall that restrains pivotal movement of said wall with respect to said hinge.

14. A patio for a ramp door being movable from a closed position to an open extended position fixable substantially parallel to a ground surface, said patio comprising:

a first wall affixed to a hinge for being fixed with respect to said ramp door, said hinge supporting said first wall for pivoting above said ramp door in its extended position, said first wall including a fixed portion and a sliding portion said fixed portion being fixed with respect to said hinge and said sliding portion being telescopingly received within said fixed portion, said sliding portion having a lower edge for being adjacent to and overlying said ramp door in its extended position, a catch plate located adjacent to said lower edge and said catch plate having an opening extending into a slot;

a first kingpin for being secured to said ramp door, said kingpin having a major diameter, an undercut, and having a shoulder near a distal end, said shoulder being spaced from said ramp door when said kingpin is affixed to said ramp door, said catch plate being movable to said kingpin so that said slot receives said undercut of said kingpin and said catch plate being retained between said shoulder of said kingpin and said ramp door when said undercut is in said first slot.

15. The patio of claim 14 further comprising:

a second wall hingeably attached to said first wall, said second wall pivotable above said ramp door in its extended position, said second wall having a second lower edge for being adjacent to and overlying said ramp door in its extended position said second wall being pivotable between a folded position with respect to said first wall and an extended position with respect to said first wall, said second wall closing said opening of said catch plate when said second wall is in said extended position with respect to said first wall.

16. The patio of claim 15, wherein said hinge provides axial and pivotal movement of said first wall.

17. The patio of claim 16, wherein said hinge includes a spring for biasing said hinge axially in a direction to lift said first wall.

18. The patio of claim 14, wherein said hinge provides axial and pivotal movement of said first wall and said hinge includes a spring for biasing said hinge axially in a direction to lift said first wall, wherein said patio includes a locking device pivotally fixed with respect to said hinge and restraining axial movement of said wall with respect to said hinge.

19. The patio of claim 18, wherein said locking device is a pivotable saddle straddling said first wall that restrains pivotal movement of said first wall with respect to said hinge.

* * * * *